(12) United States Patent
Chen

(10) Patent No.: US 10,901,756 B2
(45) Date of Patent: Jan. 26, 2021

(54) CONTEXT-AWARE APPLICATION

(71) Applicant: FUJITSU LIMITED, Kawasaki (JP)

(72) Inventor: Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 400 days.

(21) Appl. No.: 15/148,681

(22) Filed: May 6, 2016

(65) Prior Publication Data
US 2017/0322690 A1    Nov. 9, 2017

(51) Int. Cl.
   *H04L 29/08* (2006.01)
   *G06F 9/451* (2018.01)
   *G06F 3/14* (2006.01)
   *G06F 16/28* (2019.01)

(52) U.S. Cl.
   CPC .......... *G06F 9/451* (2018.02); *G06F 3/14* (2013.01); *G06F 16/288* (2019.01); *H04L 67/02* (2013.01); *H04L 67/18* (2013.01); *H04L 67/20* (2013.01)

(58) Field of Classification Search
   CPC ......... H04L 67/02; H04L 67/18; H04L 67/20; H04L 67/22; H04L 67/125; G06F 9/451; G06F 16/288; G06F 3/0482; G06F 3/04842
   See application file for complete search history.

(56) References Cited

U.S. PATENT DOCUMENTS

| | | | | |
|---|---|---|---|---|
| 8,572,559 B2 * | 10/2013 | Calvin | ............. | G06F 40/106 717/108 |
| 2002/0042819 A1 * | 4/2002 | Reichert | ......... | G06F 17/3087 709/217 |
| 2003/0148775 A1 * | 8/2003 | Spriestersbach | ....... | G06Q 10/10 455/456.1 |
| 2004/0054690 A1 * | 3/2004 | Hillerbrand | ............ | G06Q 10/06 |
| 2007/0136443 A1 * | 6/2007 | Sah | ..................... | H04L 67/2804 709/219 |

(Continued)

FOREIGN PATENT DOCUMENTS

| JP | 2002-342654 A | 11/2002 |
|---|---|---|
| JP | 2015-060347 A | 3/2015 |

OTHER PUBLICATIONS onefiremedia.com, "Native Mobile Application vs. Website Based Application", https://www.onefire.com/wp-content/uploads/2015/01/Mobile-vs-Web-Infographic.pdf, accessed May 17, 2016.

(Continued)

*Primary Examiner* — Dino Kujundzic
(74) *Attorney, Agent, or Firm* — Maschoff Brennan

(57) ABSTRACT

A method may include obtaining context data describing a context of a user of an electronic device and transmitting the context data to a back-end device. The method may also include receiving instructions from the back-end device, the instructions directing the electronic device to dynamically generate a single user interface including interactive content from a plurality of related resources, the plurality of related resources determined by the back-end device to be related to each other and to the context of the user, features of the interactive dynamic content extracted by the back-end device. The method may additionally include dynamically generating the single user interface, and displaying the single user interface to the user of the electronic device.

20 Claims, 10 Drawing Sheets

(56) References Cited

U.S. PATENT DOCUMENTS

| | | | |
|---|---|---|---|
| 2008/0034314 A1* | 2/2008 | Louch | G06F 3/0481 715/778 |
| 2009/0164883 A1* | 6/2009 | Decker | G06F 17/3089 715/234 |
| 2010/0083169 A1* | 4/2010 | Athsani | H04M 1/72522 715/810 |
| 2010/0180254 A1* | 7/2010 | Petschnigg | G06F 8/34 717/105 |
| 2011/0113341 A1* | 5/2011 | Liensberger | G06F 16/9577 715/738 |
| 2013/0073690 A1* | 3/2013 | DeSalvo | H04L 67/125 709/219 |
| 2013/0110631 A1* | 5/2013 | Mitchell | H04W 4/185 705/14.58 |
| 2013/0132183 A1* | 5/2013 | Klein | G06Q 30/0207 705/14.25 |
| 2014/0073359 A1* | 3/2014 | Issa | H04W 4/029 455/456.3 |
| 2016/0040996 A1* | 2/2016 | Skillman | G01C 21/3614 701/533 |
| 2016/0098284 A1 | 4/2016 | Herberg et al. | |

OTHER PUBLICATIONS

Optimus Information Inc., "Native, Hybrid or Mobile Web Application Development", http://www.optimusinfo.com/downloads/white-paper/native-hybrid-or-mobile-web-applications.pdf, accessed May 17, 2016.

Mario Korf and Eugene Oksman, "Native, HTML5, or Hybrid: Understanding Your Mobile Application Development Options", https://developer.salesforce.com/page/Native,_HTML5,_or_Hybrid:_Understanding_Your_Mobile_Application_Development_Options, accessed May 17, 2016.

IFTT Inc., webpage, one page, https://ifTTT.com, accessed May 17, 2016.

Zapier Inc., webpage, https://zapier.com, accessed May 17, 2016.

Nest Labs, webpage, https://www.nest.com/ Accessed May 17, 2016.

Smartthings, Inc., webpage, https://www.smartthings.com/, Accessed May 17, 2016.

JP Office Action in Application No. 2017-064913 dated Nov. 30, 2020.

* cited by examiner

Bus Routes At This Stop

337 - heading towards downtown     Next Bus Arrives at     10:57 AM (12 minutes)

369 - heading towards Laketown Mall     Next Bus Arrives at     11:04 AM (19 minutes)

415 - heading towards University Street     Next Bus Arrives at     10:46 AM (1 minutes)

615 - Express route heading towards Riverwalk Drive     Next Bus Arrives at     3:30 PM (> 4 hours)

Other Nearby Services

➢ George's Theater

➢ A's Fine Dining

➢ University Library System

*FIG. 3A*

Welcome to Paris Central Train Station (Click here for French Version)
Select Your Destination  | Louvre Art Museum |

Trains leaving in next 20 minutes

267 - heading towards Louvre
Order Ticket for 3 Euros

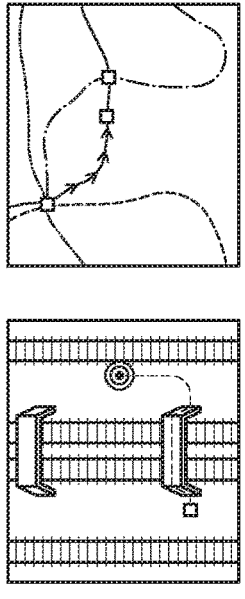

Next train Arrives at    10:57 AM (12 minutes)

1204 - Express route heading towards Airport
Order Ticket for 6 Euros

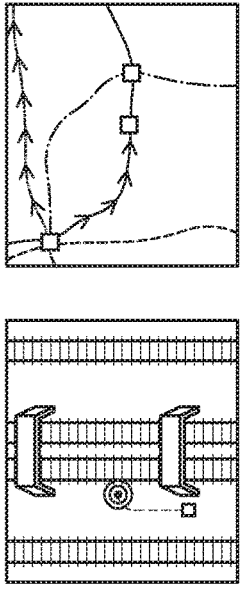

Next train Arrives at    11:04 (19 minutes)

Other Nearby Services
➢ La Boulangerie (Restuarant)
➢ Bibliotheque Nationale de France (Library/Museum)

CONTEXT-AWARE APPLICATION

FIELD

The embodiments discussed in the present disclosure are related to a context-aware application.

BACKGROUND

With the large prevalence of mobile electronic devices, many users rely on their electronic devices for a variety of purposes. Because many electronic devices are mobile, the contexts in which such electronic device may be used may vary greatly.

The subject matter claimed herein is not limited to embodiments that solve any disadvantages or that operate only in environments such as those described above. Rather, this Background Section is provided to illustrate one example technology area where embodiments of the present disclosure described herein may be practiced.

SUMMARY

In one or more embodiments, the present disclosure may include a method that may include obtaining context data describing a context of a user of an electronic device and transmitting the context data to a back-end device. The method may also include receiving instructions from the back-end device, the instructions directing the electronic device to dynamically generate a single user interface including interactive content from a plurality of related resources. The plurality of related resources may be determined by the back-end device to be related to each other and to the context of the user. The features of the interactive dynamic content may be extracted by the back-end device. The method may additionally include dynamically generating the single user interface, and displaying the single user interface to the user of the electronic device.

The object and advantages of the embodiments will be realized and achieved at least by the elements, features, and combinations particularly pointed out in the claims.

Both the foregoing general description and the following detailed description provide examples and are explanatory and are not restrictive.

BRIEF DESCRIPTION OF THE DRAWINGS

Example embodiments will be described and explained with additional specificity and detail through the use of the accompanying drawings in which:

FIG. 3A is an example user interface of a context-aware application;

FIG. 5 is an additional example user interface of a context-aware application;

DESCRIPTION

The present disclosure relates to a context aware application in which the context of a user may be a consideration in providing the user with a single view to interact with a variety of resources related to that particular context. For example, if the physical location of a user is determined to be at a train station, the context-aware application may provide the user with an option to see the location of trains coming into the station (a first set of resources), allow the user to purchase tickets for the train (a second resource), and the menu for nearby restaurants (a third set of resources). The context-aware application may provide features of the various resources that are relevant to the context of a user to the user in a single view. From the single view, the user may interact with the context-aware application to interact with the various resources.

As used herein, the term "context" may refer to a physical location (e.g., a grocery store, a bus stop, a latitude/longitude, etc.), or some task or feature associated with a physical location (e.g., ordering from a menu at a restaurant, ordering tickets at a train station, checking the bus schedule at a bus stop, etc.), even if the user is not present at the physical location.

Embodiments of the present disclosure are explained with reference to the accompanying drawings.

Figure 1:
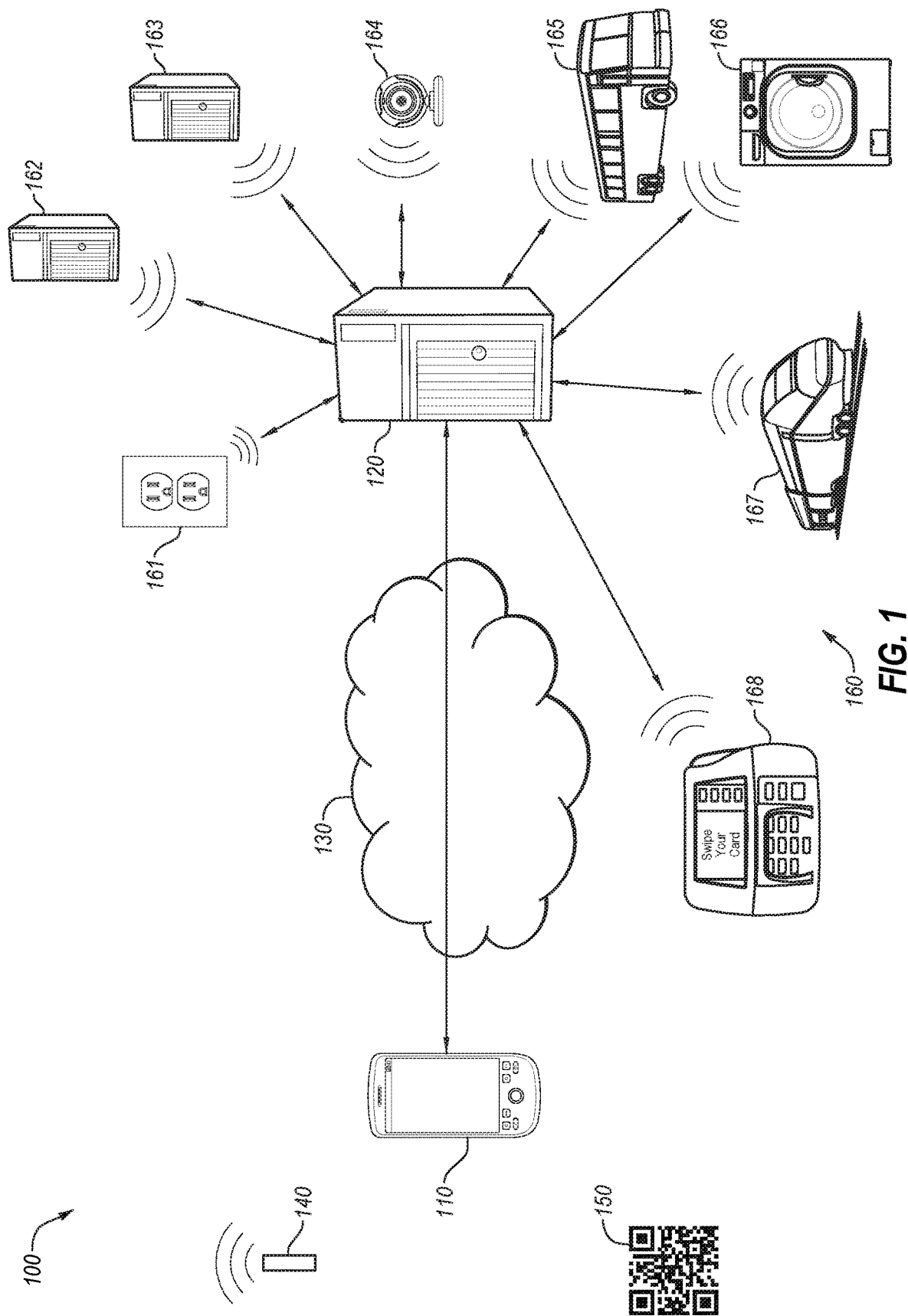
FIG. 1 is a diagram of an example system for a context-aware application.

FIG. 1 is a diagram of an example system 100 for a context-aware application, in accordance with one or more embodiments of the present disclosure. The system 100 may include an electronic device 110 and a back-end device 120 that may communicate over a network 130.

The electronic device 110 may obtain context information regarding the context of a user of the electronic device 110. For example, a location sensor in the electronic device 110 may detect the physical location of the electronic device 110. Such a location sensor may include a global positioning system (GPS) sensor, or any other location sensor.

As another example of obtaining context information, the electronic device 110 may receive data from or otherwise connect to a beacon 140 that is proximate the electronic device 110. The beacon 140 may include any device configured to communicate with an other device (e.g., the electronic device 110) to identify the context of the other device. The beacon 140 may enable detection of the physical location of the electronic device 110, tracking of the physical location of the electronic device 110, and/or triggering of a location-based event at the electronic device 110. The beacon 140 may operate using any beacon protocol such as iBeacon™, Eddystone™, Seeknfind™, etc. Additionally or alternatively, the beacon 140 may operate using near field communication (NFC) technology to communicate with the electronic device 110. As an additional example, the beacon 140 may operate using sensing technology to detect frequency emittance used by electronic devices (e.g., 2.4 gigahertz (GHz), 5 GHz, 800-900 megahertz (MHz), 1700-1800 MHz, etc.) and may communicate with detected electronic devices to facilitate location detection.

An additional example of obtaining context information may include the electronic device 110 scanning a quick response (QR) code 150 to obtain context information. The electronic device 110 may utilize a camera or other optical sensor to detect or scan the QR code 150. The QR code 150 may provide the electronic device 150 with context information. For example, the QR code 150 may identify the physical location of the electronic device 150 and/or may provide access to an activity associated with the physical location.

After obtaining context information, the electronic device 110 may transmit the context information to the back-end device 120. The back-end device 120 may provide instructions to the electronic device 110 instructing the electronic device 110 to dynamically generate a user interface that may include interactive content from multiple resources 160 related to each other and related to the context of the user of the electronic device 110. Such a user interface may be a single view that incorporates features and/or content from each of the multiple resources. After receiving the instructions, the electronic device 110 may generate the user interface and display the user interface to the user of the electronic device 110. The user interface may allow the user of the electronic device 110 to interact with the multiple resources from a single interface.

In some embodiments, the back-end device 120 may be in communication with the multiple resources 160. A resource may include any device, component, system, or combinations thereof configured to provide information or services to a user of the electronic device 110. For example, a resource may include a web service such as an on-line ticket ordering system, a website for a restaurant, an on-line menu for a restaurant, an on-line map or map service, or any other website hosting information on the Internet. As another example, a resource may include any device connected to the Internet, such as a light, an outlet, a thermostat, a security camera, a bus, an automobile, a motorcycle, an appliance (e.g., a washer, a dryer, a refrigerator, a furnace, etc.), a train, a point-of-sale terminal, or any other device able to receive or transmit information over the Internet. As illustrated in FIG. 1, the back-end device 120 may be in communication with an outlet 161, a first web server 162, a second web server 163, a camera 164, a bus 165, a dryer 166, a train 167, and a point-of sale terminal 168, each of which may be one of the resources 160.

In some embodiments, the back-end device 120 may prepare a database to facilitate providing instructions to the electronic device 110. In these and other embodiments, building the database may include a training phase and a recognition phase. The training phase may include creating classes in which the resources 160 may be classified, including a base application programming interface (API) model for a given class, and may include designating features of the base API model that may be mapped to newly discovered resources. The recognition phase may include connecting to new resources 160 to classify the new resources 160 and identify features of the new resources 160. Additionally or alternatively, the recognition phase may include identifying and storing relationships between related resources 160. Additionally or alternatively, the recognition phase may include identifying contexts to which a group of related resources may be applicable, and storing the relationship between the context and the related resources. In these and other embodiments, after multiple classes and base API models for those classes have been established, the classes and base API models may be stored in the database.

In the training phase, the back-end device 120 may create multiple classes into which resources may be classified. A class may include one or more resources with a set of features or characteristics that are common to a category or group of resources. Classes may be hierarchical, for example, a first class may include multiple sub-classes. In some embodiments, a base API model of a representative resource for the class may be generated, including features and/or characteristics that are likely to be common to other resources belonging to that class. For example, a base API model of a "restaurant" class may include a "menu" feature, an "order" feature, a "reservations" feature, and a "contact us" feature. Other examples of classes may include any web service (e.g., merchants, libraries, transportation services, etc.) or any device connected to the Internet, such as a "public transit vehicle" class (e.g., a bus, a train, etc.) or a "contract transit vehicle" class (e.g., a taxi or UBER® driver). In these and other embodiments, classes may be generated automatically or may be created by a user designating features and/or other characteristics of a particular class.

In some embodiments, a base API model with various features may be generated for comparative purposes. For example, a user of the back-end device 120 such as an administrator may manually generate base API models for a variety of classes of resources. For example, the user may generate a base API model for restaurants with a "menu" feature, an "order" feature, and a "reservations" feature by using API documents from one or more sources to generate the base API model. In these and other embodiments, the base API model and associated features may be stored in a database.

In these and other embodiments, the back-end device 120 may connect to one of the resources 160, such as the first web server 162 that may be hosting web services including train routes and a portal to purchase train tickets. The back-end device 120 may connect to the resources 160 by a web scraping process, a web crawling process, web indexing, or other similar process. As another example, the back-end device 120 may seek open portals to devices, such as an open portal for accessing the train 167.

After connecting to the resource, the back-end device 120 may generate an API model for the resource. For example, if an API document (e.g., an extensible markup language (XML) document, a schema, an API description manual document as a portable document format (PDF) document, etc.) is available, the back-end device 120 may parse the API document to locate various features of the resource. In these and other embodiments, the API document may be parsed using a natural language processing (NLP) process to locate and identify the various features of the resource. Additionally or alternatively, the API document may be manually processed by a user and various features identified. As another example, a vendor, proprietor, or other entity maintaining the resource may provide direction regarding the features of the particular resource. In these and other embodiments, the resource and associated features may be stored in the database.

In some embodiments, the back-end device 120 may classify a resource in a given class based on comparison of the resource with one or more base API models of classes stored in a database. In these and other embodiments, the comparison may be automatic (e.g., using an NLP process), or may be performed manually (e.g., by a user or by crowd-sourcing the comparison). The back-end device 120 may classify the resource in the class to which the resource most closely maps on the base API model. For example, if the first web server 162 were operating a restaurant web service that included a "menu" feature and an "order" feature, the resource may most closely map to the base API model of a "restaurant" class that may include a "menu" feature, an "order" feature, and a "reservations" feature. In these and other embodiments, for newly classified resources, a list of resources and their proposed classifications may be provided to a user of the back-end device 120 for review and/or approval. Additionally or alternatively, a list of resources that did not fit in a classification may be provided in a list for the user to manually assign to a class or to generate a new class for the resource. In some embodiments, the classification for a given resource may be provided by a vendor, proprietor, or other entity maintaining the resource.

In some embodiments, the features identified in the API model of a newly discovered resource (e.g., the first web server 162) may be mapped to a feature of a resource in the database. For example, a "view menu" feature in a resource may map to a "menu" feature of the base API model. Such mapping may be based on an automatic comparison of the "view menu" feature and the "menu" feature, or may be based on user input mapping the "view menu" feature to the "menu" feature. For example, the mapping may be crowd-sourced such that a list of features and potential mappings may be provided to users to map, or a list of features and proposed mappings may be provided to users to confirm. In these and other embodiments, the mapping may identify a feature of another resource that performs a similar or identical function.

The recognition phase of preparing the database may include identifying and storing relationships between related resources 160. Identifying related resources may include a vendor, proprietor, or other entity maintaining the resource providing a number of resources that may be related. For example, a restaurant with a delivery option may include the resource of the ordering system from the restaurant as well as the resource of the physical location of the delivery driver or vehicle as food is delivered. As another example, a city may identify a bus schedule resource, a bus ticket ordering resource, and the physical location of a bus as related resources. Additionally or alternatively, identifying related resources may include a user identifying or suggesting a relationship between resources. For example, a user at a mall may identify a merchant's ordering system and inventory resource as related to an interactive mall map resource. As another example, a user may identify a nearby restaurant resource as related to a bus stop map resource. In some embodiments, the electronic device 110 may prompt a user of the electronic device 110 if a nearby resource may be related to a resource the user is accessing or viewing. In these and other embodiments, the relationship between resources may be stored in the database.

In some embodiments, the recognition phase of preparing the database may include identifying contexts to which a group of related resources may be applicable. For example, when a user is physically close to a physical restaurant with one or more resources associated with the restaurant, the resources associated with that restaurant and any resources related to the restaurant may have a relationship with that context. As another example, when a user scans a QR code, there may be a related resource (e.g., a bus stop with a QR code may be related to the resources of the bus schedule and purchasing tickets, and a taxi service resource). The relationship between the context and the resources may be based on a vendor, proprietor, or other entity that maintains the resource providing a context in which the resource may be relevant, or may include a user identifying a context in which the resource may be relevant. For example, a user of the electronic device 110 may be prompted to indicate whether one or more nearby resources are pertinent to the location of the user, for example, a dialog box or prompt may be provided to the user of the electronic device 110 to confirm that a nearby resource is pertinent to the location of the user. In these and other embodiments, the relationship between the context and the resource or group of related resources may be stored in the database.

In some embodiments, the back-end device 120 may combine features from two or more related resources into a model graphical user interface that may include a single view that includes features from at least two different resources. For example, the interface may include a "menu" feature and a "reservations" feature of a restaurant and a related "movie listing" resource of a nearby movie theater. In these and other embodiments, features from the various related resources may be mapped to visual elements of the single view, such as windows, buttons, tags, frames, etc. In these and other embodiments, the model graphical user interface may be stored in the database. Additionally or alternatively, mappings to certain functions or visual elements may be stored in the database and the electronic device 110 may include logic to dynamically generate a user interface based on the visual elements and/or the model graphical user interface. In some embodiments, the dynamically generated user interface may be displayed in a common format and using a common visual scheme. For example, a common set of fonts, colors, buttons, tags, frames, etc. may be utilized, even if the corresponding resources may utilize a different format by default.

Modifications, additions, or omissions may be made to FIG. 1 without departing from the scope of the present disclosure. For example, the system 100 may include more or fewer elements than those illustrated and described in the present disclosure. For example, the system 100 may include any number or types or varieties of resources 160 besides those illustrated. As another example, the system 100 may include any number or types or varieties of components to provide context in addition to the beacon 140 and the QR code 150. As an additional example, any of the resources 160 may communicate with the back-end device 120 via the network 130. As a further example, any of the resources 160 may communicate directly with the electronic device 110 in addition to or in lieu of communicating with the back-end device 120.

Figure 2:
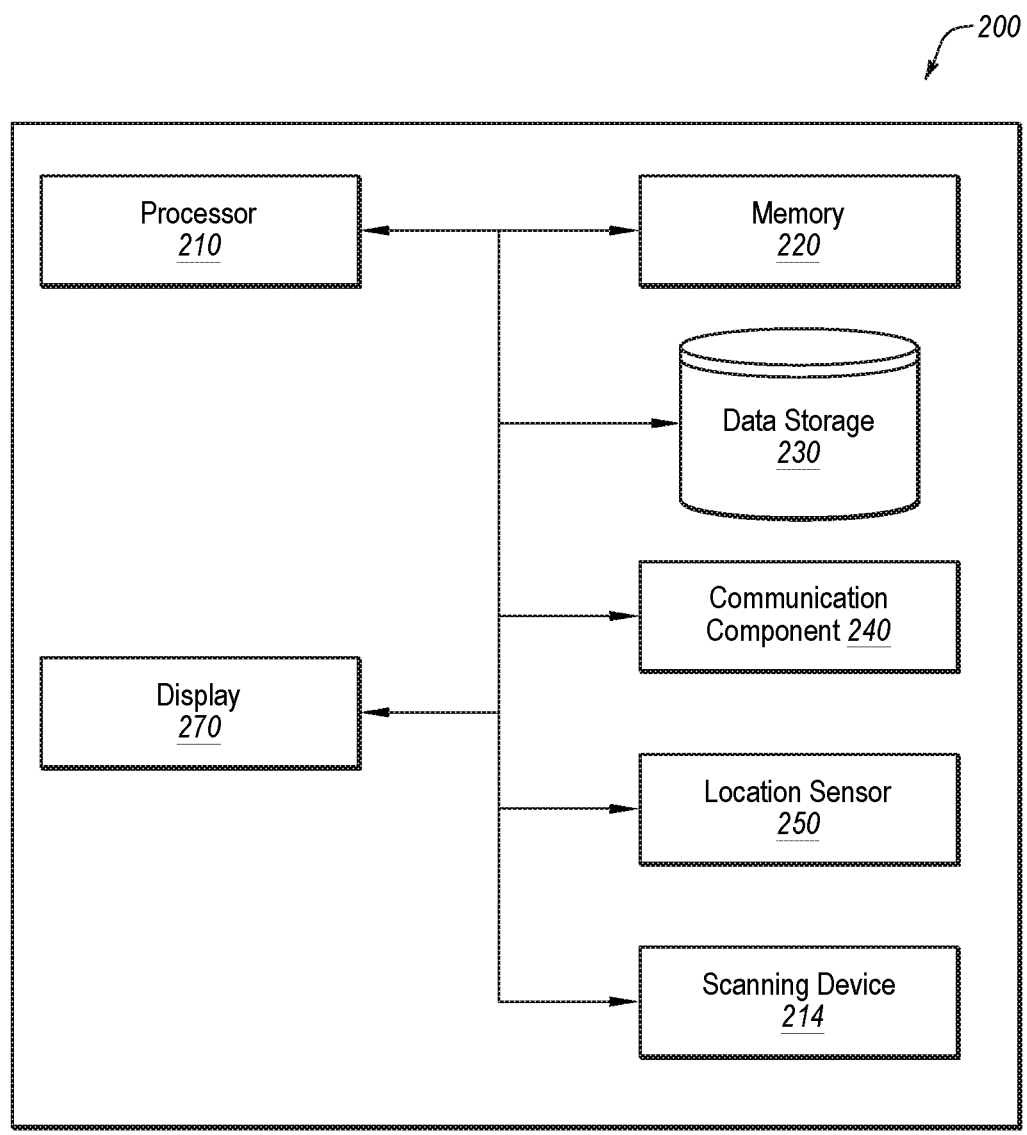
FIG. 2 is a block diagram of an example electronic device.

FIG. 2 is a block diagram of an example electronic device 200, in accordance with one or more embodiments of the present disclosure. For example, the electronic device 110 and/or the back-end device 120 of FIG. 1 may be implemented as the electronic device 200. As another example, one or more of the resources 160 may be implemented as the electronic device 200.

The electronic device 200 may include a processor 210, a memory 220, a data storage 230, a communication component 240, a location sensor 250, a scanning device 260, and a display 270. The processor 210, the memory 220, the data storage 230, the communication component 240, the location sensor 250, the scanning device 260, and/or the display 270 may all be communicatively coupled such that each of the components may communicate with the other components. The electronic device 200 may perform or control performance of any of the operations described in the present disclosure.

In general, the processor 210 may include any suitable special-purpose or general-purpose computer, computing entity, or processing device including various computer hardware or software modules and may be configured to execute instructions stored on any applicable computer-readable storage media. For example, the processor 210 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 210 may include any number of processors configured to perform or control performance of, individually or collectively, any number of operations described in the present disclosure.

In some embodiments, the processor 210 may interpret and/or execute program instructions and/or process data stored in the memory 220, the data storage 230, or the memory 220 and the data storage 230. In some embodiments, the processor 210 may fetch program instructions from the data storage 230 and load the program instructions in the memory 220. After the program instructions are loaded into memory 220, the processor 210 may execute the program instructions.

The memory 220 and the data storage 230 may include computer-readable storage media for carrying or having computer-executable instructions or data structures stored thereon. Such computer-readable storage media may include any available media that may be accessed by a general-purpose or special-purpose computer, such as the processor 210. By way of example, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 210 to perform or control performance of a certain operation or group of operations.

The communication component 240 may include any device, system, component, or collection of components configured to allow or facilitate communication between the device 200 and another device (e.g., by communicating over the network 130 of FIG. 1). For example, the communication component 240 may include a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a WiFi device, a WiMax device, cellular communication facilities, etc.), and/or the like. The communication component 240 may permit data to be exchanged with any network (including the network 130) such as a cellular network, a WiFi network, a MAN, an optical network, etc., to name a few examples, and/or any other devices described in the present disclosure, including remote devices. Combinations of any of the above may also be included within the scope of the communication component 240.

The location sensor 250 may include any device, system, component, or collection of components configured to determine or facilitate determination of the physical location of the electronic device 200. For example, the location sensor 250 may include a global positioning service (GPS) sensor, a proximity sensor, an accelerometer, a motion sensor, a gyroscope, a compass, etc. Additionally or alternatively, the location sensor 250 may include a software routine or set of instructions that utilizes the communication component 240 or other components of the electronic device 200 to determine nearby physical components and extrapolate a physical location. For example, the location sensor 250 may determine three nearest cellular telephone towers and extrapolate a physical location, or may determine a WiFi hotspot to which the communication component 240 is connected, and extrapolate a physical location. In some embodiments, the location sensor 250 may be configured to communicate with a beacon (such as the beacon 140 of FIG. 1) to sense the location of the electronic device 200. Combinations of any of the above may also be included within the scope of the location sensor 250.

The scanning device 260 may include any device, system, component, or collection of components configured to scan an image (e.g., a camera). For example, the scanning device 260 may include optical elements such as, for example, lenses, filters, holograms, splitters, etc., and an image sensor upon which an image may be recorded. Such an image sensor may include any device that converts an image represented by incident light into an electronic signal. The image sensor may include a plurality of pixel elements, which may be arranged in a pixel array (e.g., a grid of pixel elements). For example, the image sensor may comprise a charge-coupled device (CCD) or complementary metal-oxide-semiconductor (CMOS) image sensor. Various other components may also be included in the scanning device 260. The pixel array may include a two-dimensional array with an aspect ratio of 1:1, 4:3, 5:4, 3:2, 16:9, 10:7, 6:5, 9:4, 17:6, etc., or any other ratio. The image sensor may be optically aligned with one or more optical elements that focus light onto or otherwise process light for the pixel array, for example, a lens. In some embodiments, the scanning device 260 may be configured to scan in a QR code or other visual element to convey information. Such information may convey a location of the electronic device 200, a resource, a context, etc. Combinations of any of the above may also be included within the scope of the scanning device 260.

The display 270 may include any component, device, system, or combination thereof configured to visually depict information. The display 270 may include a cathode ray tube (CRT), a liquid-crystal display (LCD), a thin-film-transistor LCD, a plasma display, one or more light-emitting diodes (LED), one or more organic LEDs, one or more light bulbs, a dot matrix display, a vacuum fluorescent display, a twisted nematic field effect LCD, a super-twisted nematic LCD, electronic paper (e.g. electrophoretic display, electrowetting display, electrofluidic displays, interferometric modulator displays), etc. The display 270 may display information in any format or structure. For example, the display 270 may be implemented as a monitor, screen, panel of lights, etc. The display 270 may be implemented as a stand-alone display or as a sub-part or component of another device or system. The display 270 may include any secondary features such as three-dimensional display, touch-screen control, directional display control (e.g. viewing angle variance for the display 270), etc. Combinations of any of the above may also be included within the scope of the display 270.

Modifications, additions, or omissions may be made to FIG. 2 without departing from the scope of the present disclosure. For example, the device 200 may include more or fewer elements than those illustrated and described in the present disclosure. For example, the device 200 may omit any of the memory 220, the data storage 230, the location sensor 250, the scanning device 260, and/or the display 270, or any combinations thereof.

FIG. 3A is an example user interface 300a of a context-aware application, in accordance with one or more embodiments of the present disclosure. For example, the user interface 300a may be displayed on a display (e.g., the display 270 of FIG. 2) and/or may be dynamically generated after a user scans a QR code at a bus stop.

The user interface 300a may display information related to a resource of the bus schedule based on the context of the user, namely, that the user is at a particular bus stop. For example, the user interface 300a may display the bus routes that use the particular bus stop, and may identify when the next buses are scheduled to arrive for each of those routes. In some embodiments, the times may be based on an additional resource of a GPS locator associated with each of the next buses to arrive at the bus stop.

In some embodiments, a user viewing the graphical user interface 300a may interact with the graphical user interface 300a to request additional information or otherwise interact with the resources represented by the graphical user interface 300a. For example, a user may select one of the bus routes (e.g., a route 337) and may be provided with additional information or resources associated with that resource (e.g., the user may be presented with a user interface 300b illustrated in FIG. 3B).

Additionally, as illustrated in FIG. 3A, the user interface 300a may include reference or links to other nearby services, such as a nearby theater, a nearby restaurant, and a nearby library. These additional services and associated resources may be accessed by interacting with the user interface 300a to select one or more of the nearby services (or more particularly, to select one of the references or links thereto included in the user interface 300a).

In some embodiments, the context of the user may be sent to the back-end device as the user changes context, and the user interface 300a may be updated or modified based on changes in the context of the user. For example, if a user were to get on a bus, the context may change and the services displayed to the user may shift based on the context of the user being on the bus or the context of the destination of the user from the bus (e.g., if the user has entered a destination, or frequently gets off at the same stop). As another example, if the user were taking a taxi, as the taxi drove through different places, the context may be periodically or constantly updating based on the location of the taxi.

In some embodiments, additional services may be suggested or displayed to the user based on information other than the context information of the electronic device. For example, identifying information from the electronic device and/or the time of day may form part of the basis of selecting and/or displaying various services. In some embodiments, a history of services selected by the user and at what times may be stored by the back-end device and used to select and/or display various services. For example, if a certain user orders take-out most evenings on the way home, when the user's context indicates they are soon going to be or are on their way home, the services displayed may include restaurant services from which the user is able to order take out.

In some embodiments, the back-end device may monitor and maintain a history of choices generally made by any users. Thus, for example, when displaying services, the services may be ordered based on the most popular services in a given context, or on the services most frequently utilized in general, or at a certain time of day.

Figure 3B:
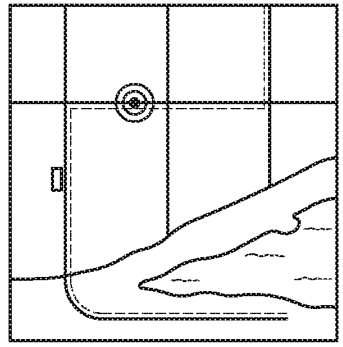
FIG. 3B is an additional example user interface of a context-aware application.

FIG. 3B is an additional example user interface 300b of a context-aware application, in accordance with one or more embodiments of the present disclosure. For example, the user interface 300b may illustrate an example of what a user may be presented with after selecting the bus route 337 from the user interface 300a of FIG. 3A.

The user interface 300b may include arrival times for the next bus of the 337 bus route as well as a map of the location of the bus. The arrival time, next three stops, etc. may be based on a bus schedule resource, and the map may be derived from an Internet-based map resource. The location of the bus on the map may be based on a positioning resource of the bus.

Additionally, the user interface 300b may include additional information from additional related resources. For example, a back-end device (e.g., the back-end device 120 of FIG. 1) may associate an Uber® resource and a taxi service resource with the bus route resource. The related resources (e.g., the Uber® resource and the taxi service resource) may be included in the user interface 300b. For example, a cost difference to use such resources and a time difference in arrival time at a destination may be included in the user interface 300b. Additionally or alternatively, the user may be presented with an option to purchase a ticket/service associated with the related resource, such as requesting an Uber® pickup rather than waiting for the bus.

In these and other embodiments, the user interface 300b may present some or all of the information associated with the various resources in a single view and using a common visual scheme. For example, a traditional web page of the taxi service may use one font, but the information related to the taxi service resource may be displayed in a common view and with a common visual scheme as the bus information related to the bus route (e.g., the taxi service information may be displayed in a different font from the traditional taxi service web page, and the same font as the bus information).

Figure 4A:
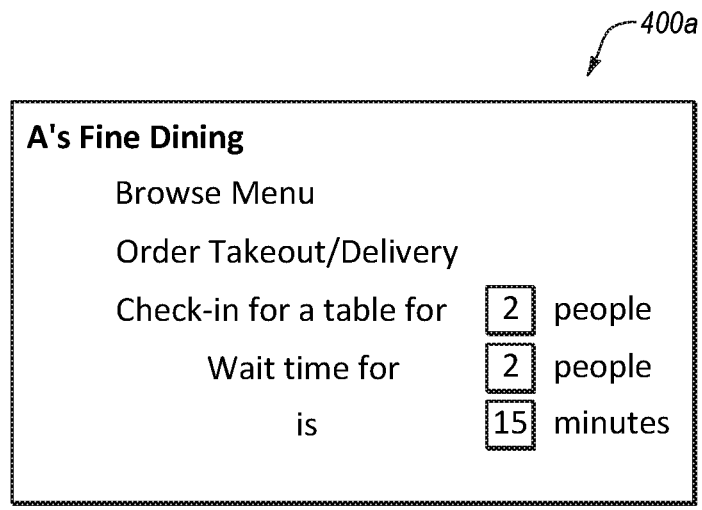
FIG. 4A is an additional example user interface of a context-aware application.

FIG. 4A is an additional example user interface 400a of a context-aware application, in accordance with one or more embodiments of the present disclosure. The user interface 400a may display features associated with resources presented to a user when the user arrives at a restaurant or when the user selects the restaurant.

The user interface 400a may present a user with multiple selections, including an option to browse the menu of the restaurant, order takeout or delivery from the restaurant, or check-in for a table for a selected number of people. The user interface 400a may also provide information related to how long the wait time is for the selected number of people. For example, the restaurant may include a resource related to the number of open tables, the number of people already waiting for a table, and the expected time of tables becoming available. As another example, the restaurant may include resources for browsing the menu and for ordering food for takeout.

Figure 4B:
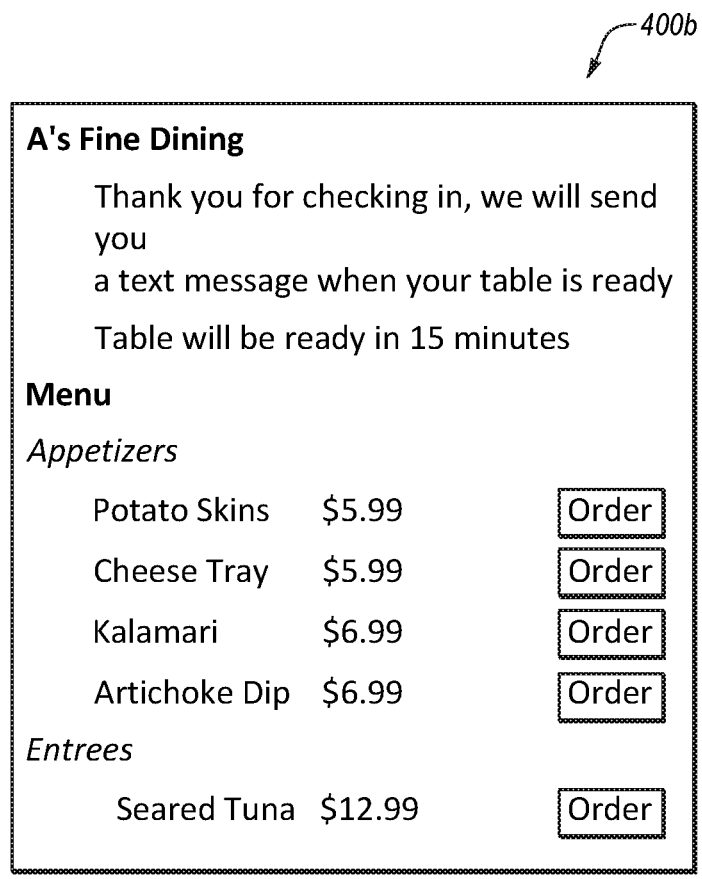
FIG. 4B is an additional example user interface of a context-aware application.

FIG. 4B is an additional example user interface 400b of a context-aware application, in accordance with one or more embodiments of the present disclosure. FIG. 4B may illustrate an example of the user interface 400b that a user may be presented with after checking in for reservations.

The user interface 400b may indicate how the user will be contacted to alert them that their table is ready. Additionally or alternatively, the user interface 400b may present the user with an option to select the menu or peruse the menu prior to being seated at a table. In these and other embodiments, the user interface 400b may include an option to purchase items from the menu while the user is waiting to be seated. For example, the user may interact with the user interface 400b to order an appetizer from the menu. The requested order may be sent to the resource provider (e.g., the restaurant) such that the appetizer may be prepared for the user when the user arrives at a table without ordering at the table.

FIG. 5 is an additional example user interface 500 of a context-aware application, in accordance with one or more embodiments of the present disclosure. The user interface 500 may illustrate features of the resources that may be presented to a user upon approaching or being in a proximity with (e.g., within a predetermined distance of) a beacon at a train station.

The user interface 500 may provide the user with a variety of features from related resources associated with the train station. For example, the user interface 500 may provide the user with an option to select a destination, such as an art museum. Additionally or alternatively, the user interface 500 may provide details as to what trains are leaving the train station in a given time, such as in the next twenty minutes. The user interface 500 may additionally or alternatively provide the user with maps of where to go to get on certain trains and where those trains will be traveling. The maps may include real time data of where trains are on the map based on a resource of the location of the trains. The user interface 500 may additionally or alternatively include nearby services, such as a restaurant or library. In these and other embodiments, the user interface 500 may include multiple language options for a resource. For example, a tourist may be able to access a set of resources in the native language of the user. Such a language option may be provided by the resource provider (e.g., the train station), by the back-end device or end-user device (e.g., by the back-end device performing a machine translation of the resource from one language into another), or by a third-party service (e.g., by a web-based translation service).

Modifications, additions, or omissions may be made to any of FIGS. 3A, 3B, 4A, 4B, and/or 5 without departing from the scope of the present disclosure. For example, the user interfaces 300a, 300b, 400a, 400b, and/or 500 may include more or fewer elements than those illustrated and described in the present disclosure. For example, any number of or relation of resources may be displayed on the user interfaces 300a, 300b, 400a, 400b, and/or 500. The user interfaces 300a, 300b, 400a, 400b, and/or 500 serve to illustrate various combinations of related resources and how such resources may be presented to a user. Any combination of resources are contemplated within the scope of the present disclosure.

Figure 6A:
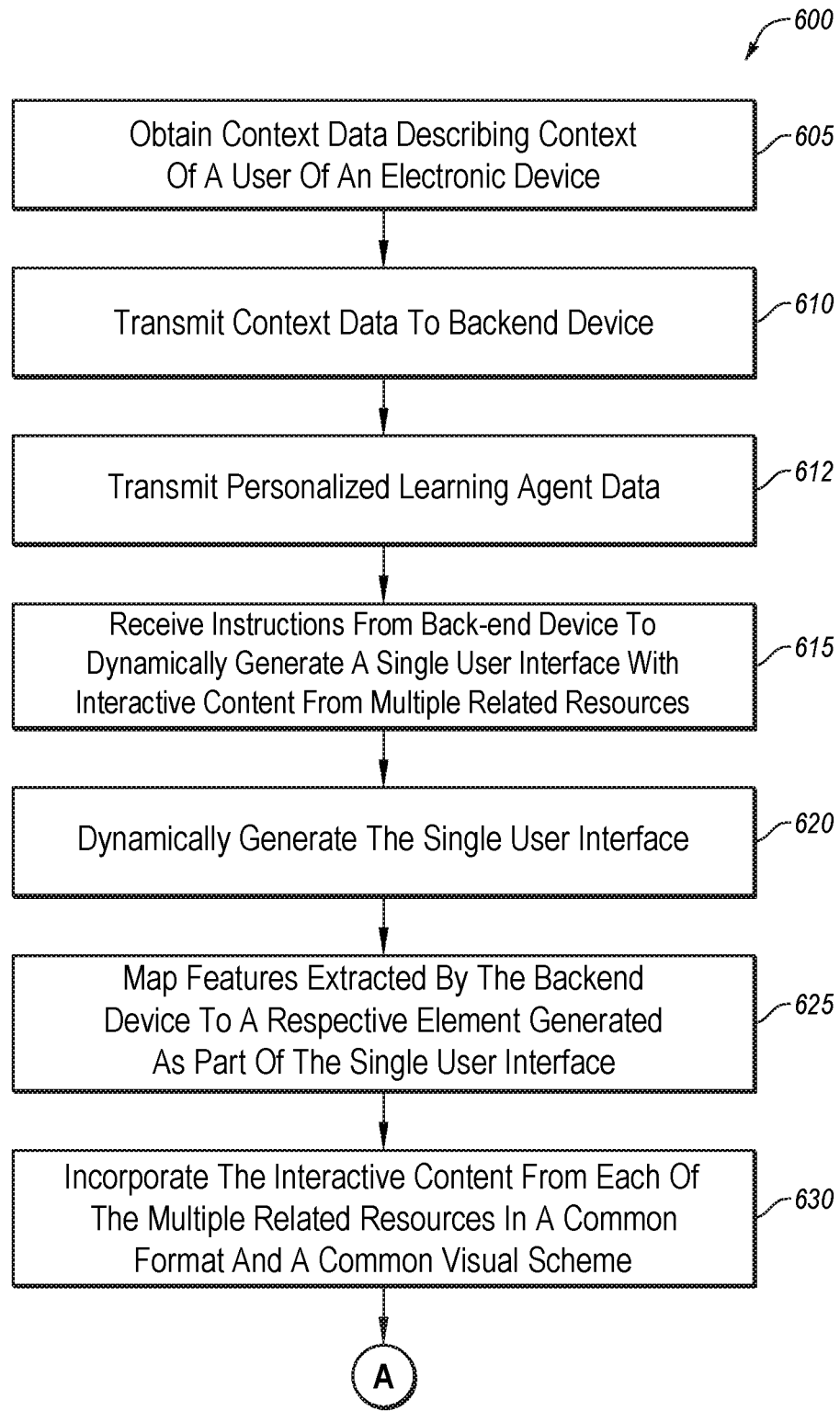
FIGS. 6A and 6B are a flow chart of an example method of utilizing a context-aware application.
Figure 6B:
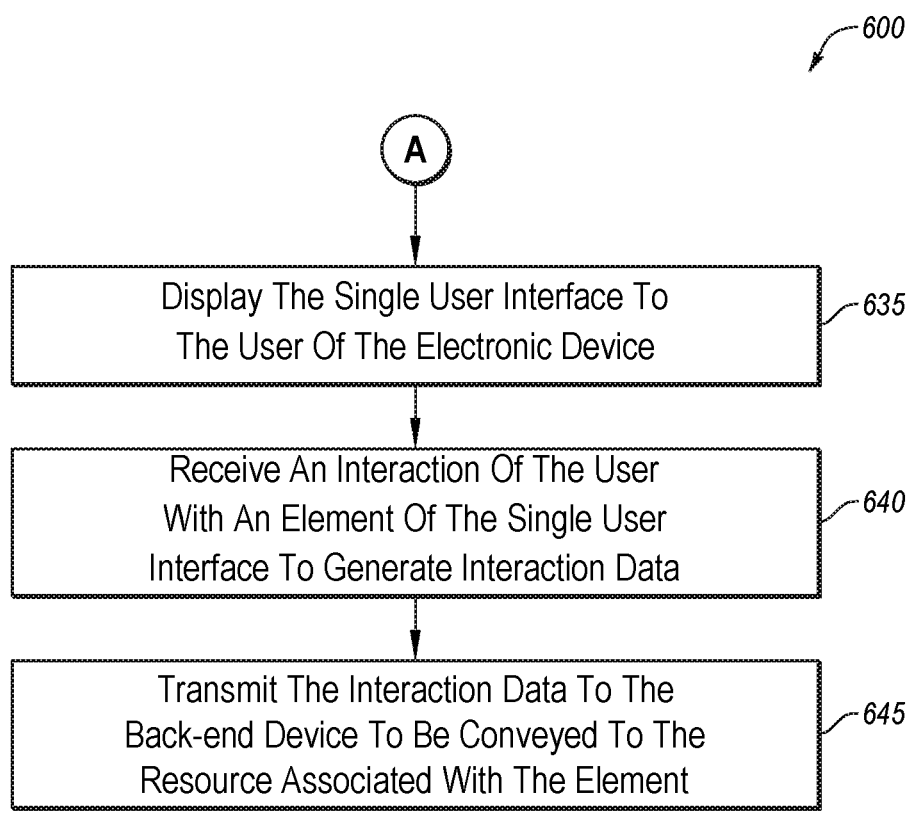

FIGS. 6A and 6B are a flow chart of an example method 600 of utilizing a context-aware application, in accordance with one or more embodiments of the present disclosure. The method 600 may be performed by any suitable system, apparatus, or device. For example, the system 100 and/or the electronic device 110 of FIG. 1 and/or the electronic device 200 of FIG. 2 may perform one or more of the operations associated with the method 600. Although illustrated with discrete blocks, the steps and operations associated with one or more of the blocks of the method 600 may be divided into additional blocks, combined into fewer blocks, or eliminated, depending on the desired implementation.

At block 605, context data describing context of a user of an electronic device (e.g., the electronic device 110 of FIG. 1) may be obtained. For example, the user of the electronic device may use the electronic device to scan a QR code (e.g., the QR code 150 of FIG. 1) at a particular physical location (e.g., a bus stop) or associated with a particular service (e.g., on an advertisement for a restaurant). As another example, the user of the electronic device may approach or come within a certain distance of a beacon (e.g., the beacon 140 of FIG. 1) that may communicate with the electronic device and the electronic device may use the communication with the beacon to obtain context data. As an additional example, a location sensing device of the electronic device, such as a GPS sensor, may detect the physical location of the user.

At block 610, the context data may be transmitted to a back-end device (e.g., the back-end device 120 of FIG. 1). For example, the electronic device may transmit the context data over a network (e.g., the network 130 of FIG. 1) to the back-end device.

At block 612, the electronic device may transmit information to a personalized learning agent. For example, a personalized learning agent may operate on the back-end device to track user interactions with the electronic device and/or with one or more services. The personalized learning agent may track times of day at which certain actions occur and/or contexts in which certain actions occur. The personalized learning agent may receive some or all such data at the back-end device to be utilized in personalizing and/or prioritizing services displayed to the user. In some embodiments, the personalized learning agent may use a machine learning method such as reinforcement learning to determine which resources to display. In these and other embodiments, the personalized learning agent may be located on the electronic device.

At block 615, instructions may be received from the back-end device to dynamically generate a single user interface with interactive content from multiple related resources. For example, the electronic device may receive instructions mapping features from multiple resources to visual elements of a user interface. As another example, the electronic device may receive instructions to generate a user interface with data pulled from one or more of the multiple resources. In these and other embodiments, the instructions may include a model user interface.

At block 620, the single user interface may be dynamically generated. For example, the electronic device may use the instructions received from the back-end device to dynamically generate the single user interface. In these and other embodiments, the single user interface may include features from the multiple resources. Additionally or alternatively, the features may be mapped to one or more visual elements of the interface. Examples of such a user interface are illustrated in FIGS. 3A, 3B, 4A, 4B, and 5.

At block 625, features extracted by the back-end device may be mapped to respective elements generated as part of the single user interface. For example, if the back-end device had extracted a "menu" feature and an "order" feature of a restaurant resource, those features may be mapped to respective visual elements of the single user interface. In some embodiments, the mapping of block 625 may be part of the dynamic generation performed at block 620.

At block 630, the interactive content from each of the multiple related resources may be incorporated into a common format and a common visual scheme. In these and other embodiments, in generating the single user interface, the electronic device may incorporate at least one feature from each of the resources. The common format and common visual scheme may include, for example, a common font, a common set of colors, etc. In some embodiments, the incorporation of block 630 may be part of the dynamic generation performed at block 620.

At block 635 (of FIG. 6B), the single user interface may be displayed to the user of the electronic device. For example, the electronic device may output the single user interface on a display associated with or part of the electronic device.

At block 640, an interaction of the user with an element of the single user interface may be received to generate interaction data. For example, the user of the electronic device may click, touch, or otherwise select one of the elements of the single user interface that is mapped to one of the features of the resources (e.g., the user may click the "menu" button corresponding to a "menu" feature of a restaurant resource). The interaction of the user with the electronic device may be captured as interaction data.

At block 645, the interaction data may be transmitted to the back-end device to be conveyed to the resource associated with the element. For example, after capturing the interaction data, the electronic device may transmit the interaction data to the back-end device (e.g., if a user touches the "menu" button, that interaction may be transmitted to the back-end device). The back-end device may convey the interaction to the resource associated with the element. For example, the back-end device may transmit the "menu" request to the resource.

Accordingly, the method 600 may utilize a context-aware application. Modifications, additions, or omissions may be made to the method 600 without departing from the scope of the present disclosure. For example, one or more of the blocks 605, 610, 615, 620, 625, 630, 640, and 645 may be omitted. For example, the operations of the method 600 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 7A:
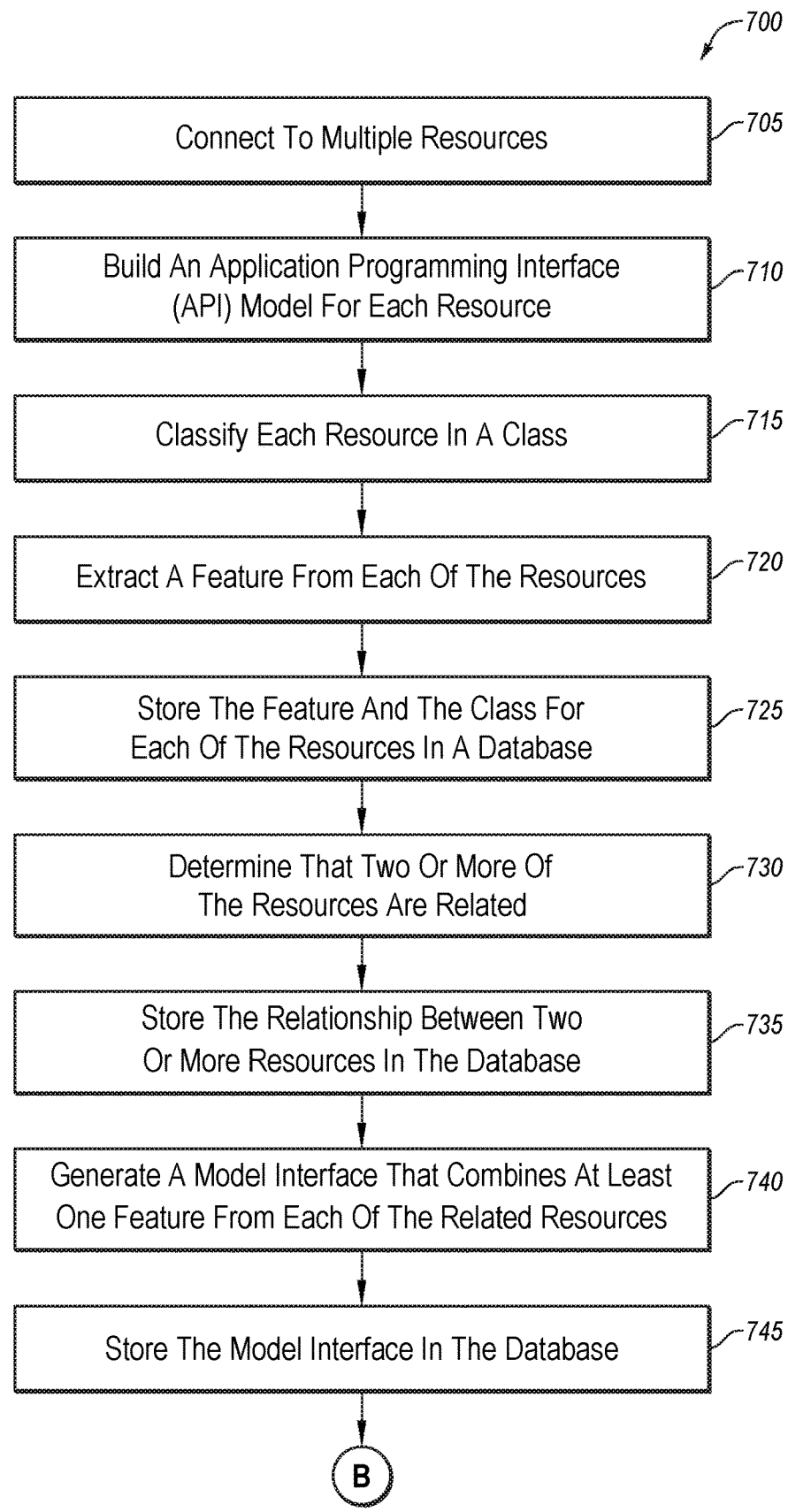
FIGS. 7A and 7B are a flow chart of an example method of a back-end device associated with a context-aware application.
Figure 7B:
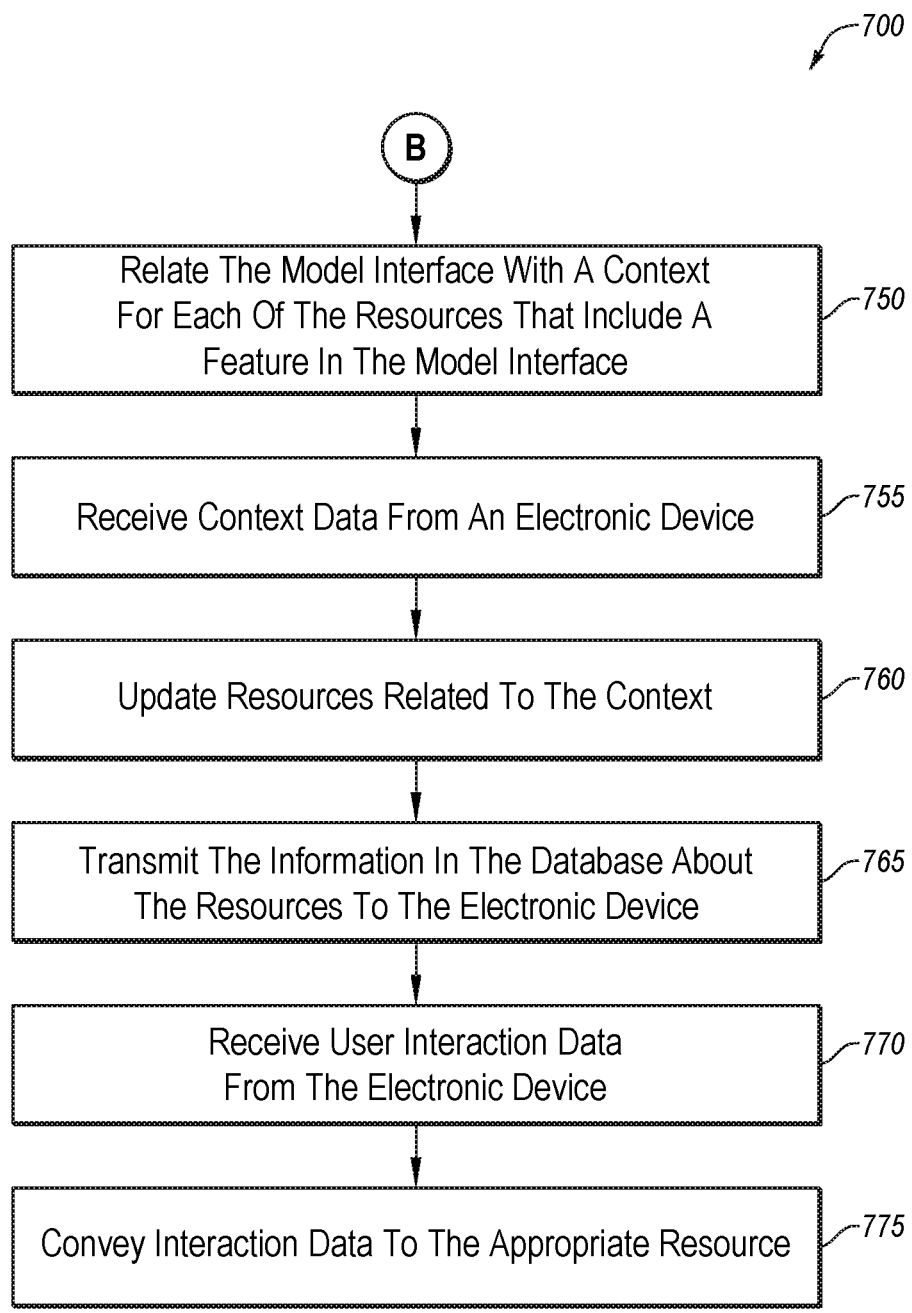

FIGS. 7A and 7B are a flow chart of an example method 700 of a back-end device associated with a context-aware application, in accordance with one or more embodiments of the present disclosure. The method 700 may be performed by any suitable system, apparatus, or device. For example, the system 100 and/or the back-end device 120 of FIG. 1 and/or the electronic device 200 of FIG. 2 may perform one or more of the operations associated with the method 700. Although illustrated with discrete blocks, the steps and operations associated with one or more of the blocks of the method 700 may be divided into additional blocks, combined into fewer blocks, or eliminated, depending on the desired implementation.

At block 705, a connection may be made with multiple resources (e.g., the resources 160 of FIG. 1). For example, a back-end device (e.g., the back-end device 120 of FIG. 1) may connect with multiple resources. The connections may be made simultaneously or individually, or any combination thereof. For example, the back-end device may connect with a first resource and then connect with a second and third resource simultaneously.

At block 710, an API model may be built for each resource. For example, an API document (e.g., an XML schema) of a particular resource may be parsed by the back-end device. As another example, the resource may be manually parsed to generate the API model. Additionally or alternatively, a provider of the resource may identify or otherwise provide the API model for the resource.

At block 715, each resource may be classified in a class. For example, the back-end device may compare the API model and/or other aspects of a given resource with one or more base API models for one or more different classes. The particular resource may be classified in the class to which the API model most closely matches. Additionally or alternatively, a user of the back-end device may identify a particular class to which the resource may belong. For example, the back-end device may provide a recommendation for a given resource, or the user of the back-end device may select the resource as the base model for a new class.

At block 720, a feature may be extracted from each of the resources. For example, the back-end device may extract one or more features from a first resource, and may extract one or more different or similar features from a second resource. Such an extraction may be performed by parsing or otherwise identifying features within the API model built for each of the resources. As another example, a user of the back-end device may extract or identify one or more features associated with the resource from the API model.

At block 725, the feature and the class for each of the resources may be stored in a database. For example, an entry may be created by the back-end device within a database for a particular resource that may include the features and/or the class for the particular resource. Additionally or alternatively, the database may store an address or location of the resource (e.g., an internet protocol (IP) address or web address).

At block 730, a determination may be made that two or more of the resources are related. For example, a provider of a resource may identify other resources that may be related to the resource (e.g., a provider of an Uber® resource may identify the resource as being related to bus and/or taxi service resources). Additionally or alternatively, a user of the back-end device or another electronic device may identify a relationship between two or more resources. For example, a user may be queried as to whether a resource nearby where the user is physically located is related to another resource the user is accessing. In these and other embodiments, a user of the back-end device may identify or confirm a relationship between two or more resources.

At block 735, the relationship between the two or more resources may be stored in the database. For example, the back-end device may store the relationship as an entry associated with the resource in the database. For example, if a bus schedule resource were related to a bus location resource and an Uber® resource, each of those three resources may have an entry in the database indicating, identifying, and/or describing the relationship with the other two resources.

At block 740, a model interface may be generated that combines at least one feature from each of the related resources. For example, the back-end device may generate a model interface that may be transmitted to an electronic device as a model layout in generating a user interface. Additionally or alternatively, the model interface may include instructions mapping certain features of the base model API of a class to a give visual element or aspect of the model interface. For example, for a restaurant class of resources, the model interface may map a "menu" feature to a particular visual element such that other resources of the restaurant class with a "menu" feature may also map to that particular visual element.

At block 745, the model interface may be stored in the database. For example, the back-end device may store the model interface in the database.

At block 750 (e.g., as illustrated in FIG. 7B), a relationship between the model interface and a context for each of the resources with a feature in the model interface may be established. For example, for the restaurant class of resources, any resource with a "menu" feature may be related to the model interface with that feature for a context of at the physical location of the restaurant. As another example, for a model interface with bus schedules on the model interface, a relationship may be established between a certain context (e.g., at a bus station or on a bus) and the model interface. Additionally or alternatively, a relationship may be made between the context and a particular resource, and that relationship may be stored in the database. For example, a relationship may be determined between a context (e.g., on the bus) and a given resource (e.g., the bus location and/or the bus schedule).

At block 755, context data may be received from an electronic device (e.g., the electronic device 110 of FIG. 1). For example, the electronic device may transmit the context data to the back-end device over the network, such as a QR code, a physical location (e.g., a latitude and longitude or a street address).

At block 760, the resources related to the context may be updated. For example, the back-end device may retrieve a model user interface related to a context and may connect to the resources with features in the model user interface to update any data associated with the feature. Additionally or alternatively, the back-end device may retrieve resources related to the context and may connect to the resources to update any data associated with features of the resource. In these and other embodiments, the back-end device may store the updated data in the database. For example, if the context data was that a user of an electronic device were at a restaurant, the back-end device may connect to a "menu" resource of the restaurant to update any changes to the "menu" resource. In some embodiments the back-end device may update resources based on data received at a personalized learning agent from the electronic device. Additionally or alternatively, the back-end device may modify the order of resources based on such data. In these and other embodiments, the back-end device may further update resources based on personalized learning data from multiple users.

At block 765, information in the database about the resources may be transmitted to the electronic device. For example, instructions may be transmitted to the electronic device to dynamically generate a single user interface that may include one or more of the features of the resources and associated data from the database. Additionally or alternatively, the back-end device may transmit a model interface from the database with a mapping of features of resources associated with the context mapped to visual elements of the model interface. For example, the back-end device may transmit the updated "menu" to a user at a restaurant to include in a single user interface.

At block 770, user interaction data (e.g., the user interaction data generated at block 640 of FIG. 6) may be received from the electronic device. For example, a user touching or selecting an option to order an item from a menu may be received by the back-end device from the electronic device.

At block 775, the interaction data may be conveyed to the appropriate resource. For example, if the interaction data included a user selecting an option to order an item from a menu, the back-end device may convey the request to order to the restaurant resource.

Accordingly, the method 700 may be performed by a back-end device in conjunction with a context-aware application. Modifications, additions, or omissions may be made to the method 700 without departing from the scope of the present disclosure. For example, the operations of the method 600 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," the term "containing" should be interpreted as "containing, but not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
obtaining context data describing a context of a user of an electronic device;
transmitting the context data to a back-end device;
receiving instructions from the back-end device, the instructions directing the electronic device to dynamically generate a single user interface including interactive content from a plurality of related resources, the instructions received in response to an immediately preceding user interaction with a previous iteration of the single user interface, the interactive content including at least two different invokable web-interface functions from two different resources, a first of the two different resources including a first and a second invokable web-interface function, the plurality of related resources determined by the back-end device to be related to each other and to the context of the user, wherein one of the at least two different invokable web-interface functions are related to the immediately preceding user interaction with the previous iteration of the single user interface, wherein the first invokable web-interface function is included in the instructions instead of the second invokable web-interface function based on the immediately preceding interaction with the previous iteration of the single user interface and a physical location of the electronic device, and wherein features of the interactive content are extracted by the back-end device;
dynamically generating the single user interface, comprising:
mapping each of the features extracted by the back-end device to a respective element generated as part of the single user interface, including mapping each of the at least two different invokable web-interface functions including the first invokable web-interface function to invokable interface elements in the single user interface, the invokable interface elements of the single user interface invoking the invokable web-interface functions from the two different resources; and
incorporating the interactive content from each of the plurality of related resources in a common format and a common visual scheme of the single user interface, at least one of the invokable interface elements of the single user interface different than in the previous iteration of the single user interface; and
displaying the single user interface to the user of the electronic device.

2. The method of claim 1, wherein obtaining the context data includes obtaining at least one of location information from a location sensing component of the electronic device, beacon data from an electronic beacon proximate the electronic device, or a quick response (QR) code scanned by the electronic device.

3. The method of claim 1, wherein the plurality of related resources are retrieved from two or more third parties.

4. The method of claim 1, wherein the plurality of related resources include one web service and one device connected to the Internet.

5. The method of claim 4, wherein the one device includes one of a vehicle, a point-of-sale terminal, an appliance, a security camera, an electrical outlet, a thermostat, or a light.

6. The method of claim 1, further comprising:
receiving an interaction of the user with an element of the single user interface to generate interaction data; and
transmitting the interaction data to the back-end device to be conveyed to a resource of the plurality of resources associated with the element of the single user interface.

7. The method of claim 1, wherein the back-end device determines the plurality of related resources are related to each other and to the context of the user and extracts the features of the interactive content by:
connecting to the plurality of resources;
building an application interface (API) model for each of the plurality of resources;
classifying each of the plurality of resources in a class;
extracting a feature from each of the plurality of resources;
storing the feature and the class for each of the plurality of resources in a database;
determining that two or more of the plurality of resources are related by a relationship;
storing the relationship between the two or more of the plurality of resources in the database;
generating a model interface that combines at least one of the features from each of the plurality of resources that are related to each other;
storing the model interface in the database; and
relating the model interface with a context for each of the plurality of resources that include a feature in the model interface.

8. The method of claim 1, further comprising:
displaying a confirmation inquiry on the single user interface to confirm whether a different resource is related to a particular resource of the plurality of resources;
receiving a confirmation input from the user that the different resource and the particular resource are related; and
transmitting the confirmation input to the back-end device.

9. A non-transitory computer-readable medium containing instructions that, when executed by a processor, are configured to cause the processor to perform or control performance of one or more operations, the operations including:
obtaining context data describing a context of a user of an electronic device;
transmitting the context data to a back-end device;
receiving instructions from the back-end device, the instructions directing the electronic device to dynamically generate a single user interface including interactive content from a plurality of related resources, the instructions received in response to an immediately preceding user interaction with a previous iteration of the single user interface, the interactive content including at least two different invokable web-interface functions from two different resources, a first of the two different resources including a first and a second invokable web-interface function, the plurality of related resources determined by the back-end device to be related to each other and to the context of the user, wherein one of the at least two different invokable web-interface functions are related to the immediately preceding user interaction with the previous iteration of the single user interface, wherein the first invokable web-interface function is included in the instructions instead of the second invokable web-interface function based on the immediately preceding interaction with the previous iteration of the single user interface and a physical location of the electronic device, and wherein features of the interactive content are extracted by the back-end device;

dynamically generating the single user interface, comprising:

mapping each of the features extracted by the back-end device to a respective element generated as part of the single user interface, including mapping each of the at least two different invokable web-interface functions including the first invokable web-interface function to invokable interface elements in the single user interface, the invokable interface elements of the single user interface invoking the invokable web-interface functions from the two different resources; and incorporating the interactive content from each of the plurality of related resources in a common format and a common visual scheme of the single user interface at least one of the invokable interface elements of the single user interface different than in the previous iteration of the single user interface; and displaying the single user interface to the user of the electronic device.

10. The non-transitory computer-readable medium of claim 9, wherein obtaining the context data includes obtaining at least one of location information from a location sensing component of the electronic device, beacon data from an electronic beacon proximate the electronic device, or a quick response (QR) code scanned by the electronic device.

11. The non-transitory computer-readable medium of claim 9, wherein the plurality of related resources are retrieved from two or more third parties.

12. The non-transitory computer-readable medium of claim 9, wherein the plurality of related resources include one web service and one device connected to the Internet.

13. The non-transitory computer-readable medium of claim 12, wherein the one device includes one of a vehicle, a point-of-sale terminal, an appliance, a security camera, an electrical outlet, a thermostat, or a light.

14. The non-transitory computer-readable medium of claim 9, wherein dynamically generating the single user interface comprises:

mapping each of the features extracted by the back-end device to a respective element generated as part of the single user interface; and incorporating the interactive content from each of the plurality of related resources in a common format and a common visual scheme of the single user interface.

15. The non-transitory computer-readable medium of claim 9, wherein the operations additionally include:

receiving an interaction of the user with an element of the single user interface to generate interaction data; and transmitting the interaction data to the back-end device to be conveyed to a resource of the plurality of resources associated with the element of the single user interface.

16. The non-transitory computer-readable medium of claim 9, wherein the back-end device determines the plurality of related resources are related to each other and to the context of the user and extracts the features of the interactive content by:

connecting to the plurality of resources;

building an application interface (API) model for each of the plurality of resources;

classifying each of the plurality of resources in a class;

extracting a feature from each of the plurality of resources;

storing the feature and the class for each of the plurality of resources in a database;

determining that two or more of the plurality of resources are related by a relationship;

storing the relationship between the two or more of the plurality of resources in the database;

generating a model interface that combines at least one of the features from each of the plurality of resources that are related to each other;

storing the model interface in the database; and relating the model interface with a context for each of the plurality of resources that include a feature in the model interface.

17. A system comprising:

a back-end device; and an electronic device, the electronic device including:

a display;

a processor; and a computer-readable medium containing instructions that, when executed by the processor, are configured to cause the processor to perform or control performance of operations, the operations including:

obtaining context data describing a context of a user of the electronic device;

transmitting the context data to the back-end device;

receiving instructions from the back-end device, the instructions directing the electronic device to dynamically generate a single user interface including interactive content from a plurality of related resources, the instructions received in response to an immediately preceding user interaction with a previous iteration of the single user interface, the interactive content including at least two different invokable web-interface functions from two different resources, a first of the two different resources including a first and a second invokable web-interface function, the plurality of related resources determined by the back-end device to be related to each other and to the context of the user, wherein one of the at least two different invokable web-interface functions are related to the immediately preceding user interaction with the previous iteration of the single user interface, wherein the first invokable web-interface function is included in the instructions instead of the second invokable web-interface function based on the immediately preceding interaction with the previous iteration of the single user interface and a physical location of the electronic device, and wherein features of the interactive content are extracted by the back-end device;

dynamically generating the single user interface, comprising:

mapping each of the features extracted by the back-end device to a respective element generated as part of the single user interface, including mapping each of the at least two different invokable web-interface functions including the first invokable web-interface function to invokable interface elements in the single user interface, the invokable interface elements of the single user interface invoking the invokable web-interface functions from the two different resources; and incorporating the interactive content from each of the plurality of related resources in a common format and a common visual scheme of the single user interface, at least one of the invokable interface elements of the single user interface different than in the previous iteration of the single user interface; and displaying the single user interface on the display of the electronic device.

18. The system of claim 17, wherein the back-end device determines the plurality of related resources are related to each other and to the context of the user and extracts the features of the interactive content by:

connecting to the plurality of resources;

building an application interface (API) model for each of the plurality of resources;

classifying each of the plurality of resources in a class;

extracting a feature from each of the plurality of resources;

storing the feature and the class for each of the plurality of resources in a database;

determining that two or more of the plurality of resources are related;

storing the relationship between the two or more of the plurality of resources in the database;

generating a model interface that combines at least one of the features from each of the plurality of resources that are related to each other;

storing the model interface in the database; and relating the model interface with a context for each of the plurality of resources that include a feature in the model interface.

19. The system of claim 17, wherein the electronic device additionally includes at least one of a sensor for detecting the physical location of the electronic device and a scanner for scanning a quick response (QR) code.

20. The system of claim 17, wherein the plurality of related resources are retrieved from two or more third parties.

* * * * *